DUAL MODULATED REMOTE CONTROL SYSTEM

Filed Dec. 31, 1963 2 Sheets-Sheet 1

Willard S. Reynolds
INVENTOR.
BY Clarence A. O'Brien
and Harvey B. Jacobson
Attorneys

DUAL MODULATED REMOTE CONTROL SYSTEM

Filed Dec. 31, 1963 2 Sheets-Sheet 2

Willard S. Reynolds
INVENTOR.
BY Clarence A. O'Brien
and Harvey B. Jacobson
Attorneys 3,271,680

DUAL MODULATED REMOTE CONTROL SYSTEM

Willard S. Reynolds, Hollywood, Fla., assignor to Telectron Company, Division of Elliott & Evans, Inc., Fort Lauderdale, Fla., a corporation of Ohio Filed Dec. 31, 1963, Ser. No. 334,791
14 Claims. (Cl. 325—37)

This invention relates to a private remote control or communication system and more particularly to a remote control system whereby authorized operation may be initiated for various mechanisms, such as garage doors without any danger of unintentional or unauthorized opening thereof.

It is therefore a primary object of the present invention to provide a transmitter to be operated by the user and a receiver unit to be connected to the mechanism to be operated whereby the mechanism may be operated under remote control in a reliable manner without any danger of unintentional or unauthorized operation.

In accordance with the foregoing object, the remote control system of the present invention involves the dispatch of radio-frequency signal energy from a small transmitter device adapted to be held in the hand of the user, the signal energy radiated being sequentially modulated at different audio-modulating frequencies in a code sequence through which an operating device is triggered. The operating device is therefore associated with a receiver unit tuned to the carrier frequency of the transmitter device and arranged to detect the modulating frequencies aforementioned. The receiver unit is therefore operative upon receipt of the proper code sequence of modulating frequency signals, to trigger a utilization circuit for operating the device with which the receiver unit is associated. The receiver unit may of course be associated with any equipment for performing different functions.

An additional object in accordance with the foregoing object, is to provide a receiver for a coded sequence of modulated signals employing a resonant frequency interlock through which unintentional triggering of the control mechanism is prevented.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
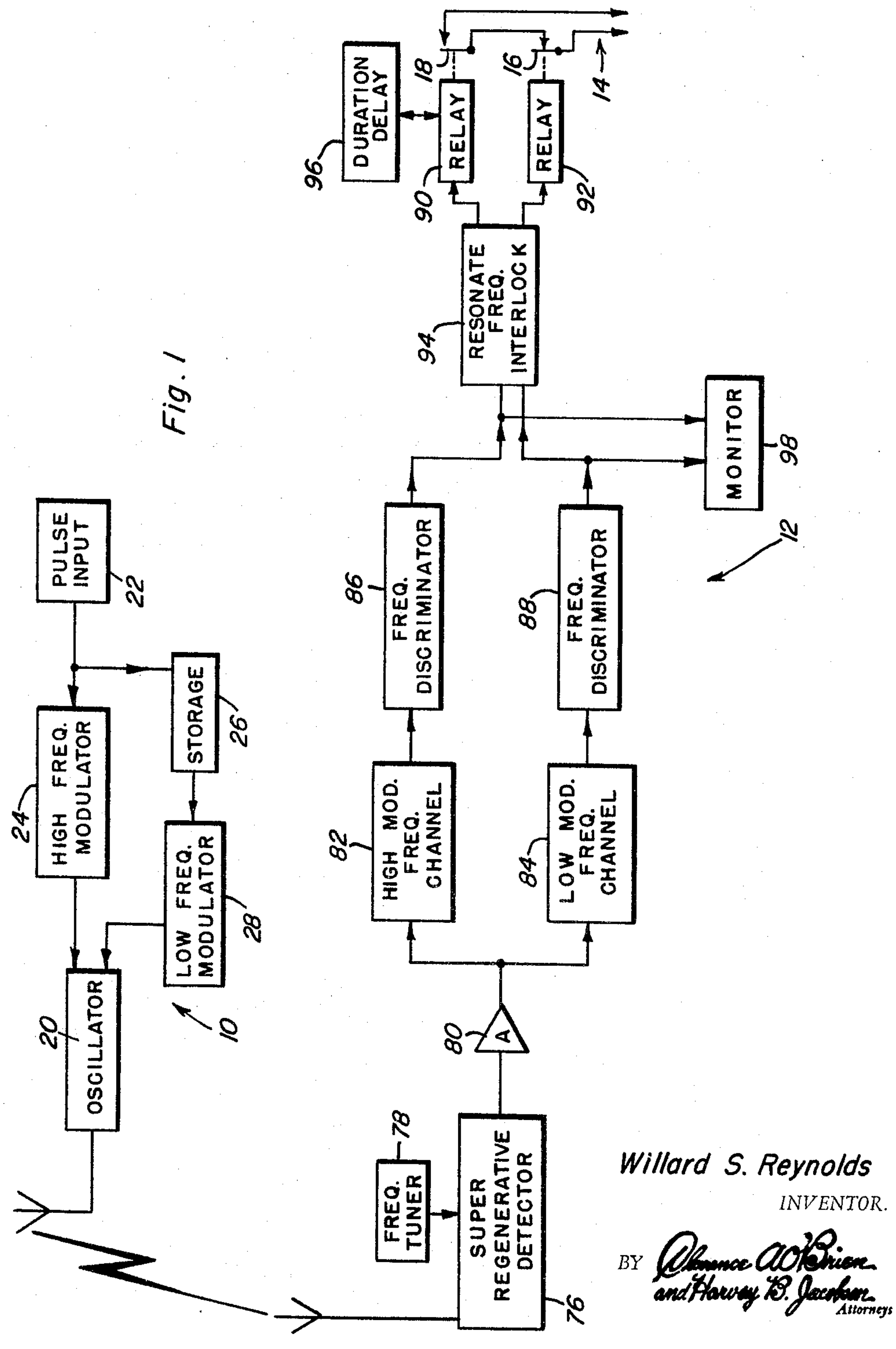
FIGURE 1 is a diagram illustrating the underlying principles of the present invention.

Referring now to the drawings in detail, and initially to FIGURE 1, it will be observed that the system of the present invention involves a transmitter device generally referred to by reference numeral 10 from which signal energy is radiated for reception by a receiver unit generally referred to by reference numeral 12, the receiver unit being operatively connected for triggering an operating mechanism or for performing any desired functions in connection with other equipment through a utilization circuit generally referred to by reference numeral 14. The utilization circuit may therefore be completed by simultaneous closing of a pair of relay switches 16 and 18 connected in series. It should of course be appreciated, that the relay switches may be disposed in other arrangements for performing various functions.

The transmitter device is preferably of the type which radiates radio-frequency energy at a predetermined carrier frequency to which the receiver unit 12 is tuned. The transmitter device is therefore provided with an oscillator component 20 through which the carrier frequency signal is generated. Generation of the signal energy is however initiated by a pulse input component 22 which may be under the control of the user, the input being operative through a modulator circuit component 24 to modulate the carrier frequency signal preferably at some audio-modulating frequency. At the same time, pulse input energy may be stored in the storage component 26 from which a low frequency modulator component 28 is operative on the oscillator 20 to change the modulation thereof to another modulating frequency. In this manner, the radiated output of the transmitter device may be modulated in a code sequence at different audio-modulating frequencies including a relatively high frequency followed by a relatively low modulating frequency.

Figures 2, 3:
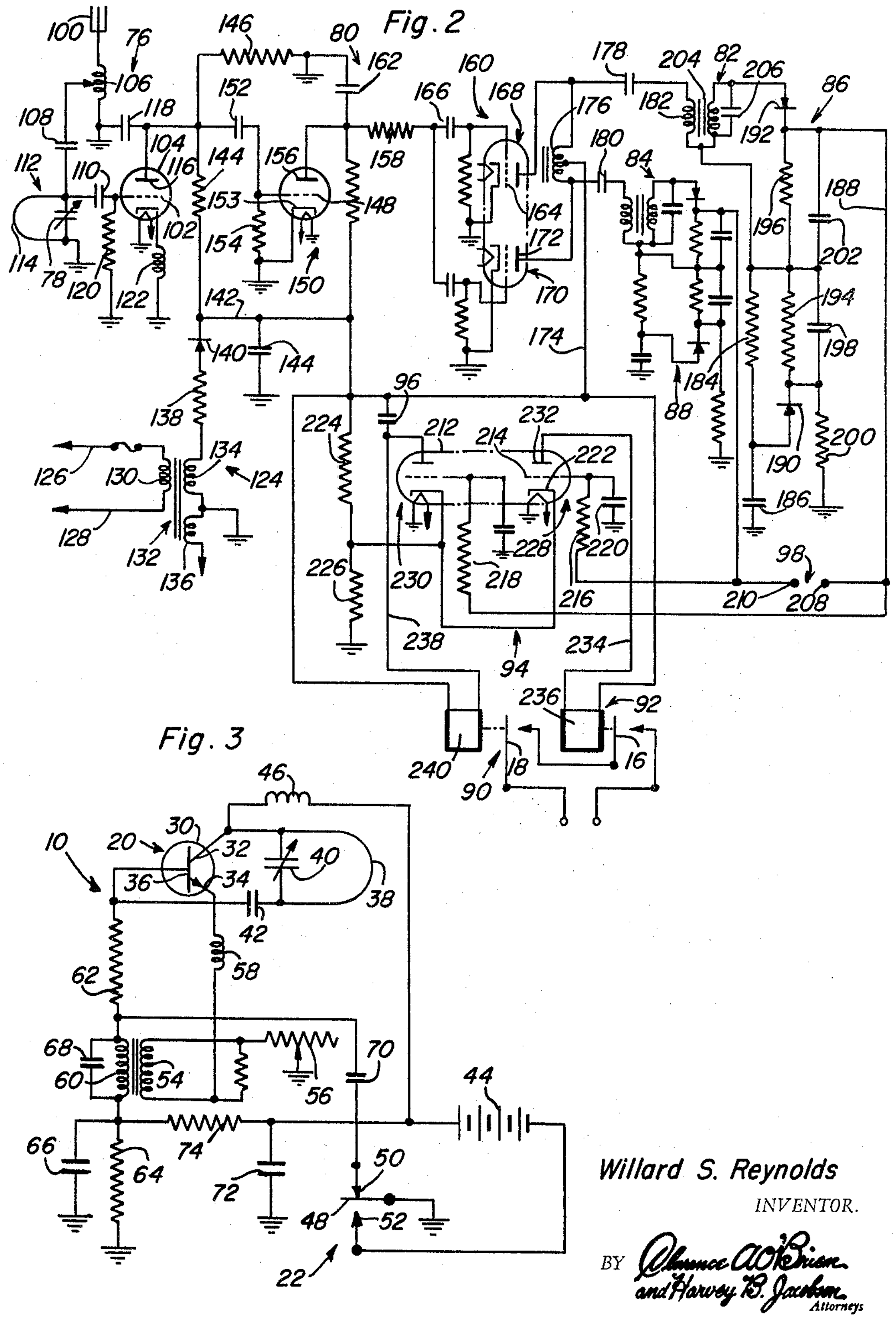
FIGURE 2 is an electrical circuit diagram corresponding to the receiver portion of the system of the present invention.
FIGURE 3 is an electrical circuit diagram corresponding to the one form of transmitter device associated with the system of the present invention.

Referring now to FIGURE 3 in particular, one form of transmitter device is illustrated including a solid state oscillator of the self-excited variable frequency type. The oscillator 20 therefore includes a transistor 30 having a collector 32, an emitter 34 and a base 36. The base-collector output circuit of the transistor is connected to a radiating inductor loop 38 shunted by a variable tuning capacitor 40 through which the carrier frequency of the radiated signal is adjusted. The radiating inductor 38 is connected directly to the output collector 32 and coupled through the capacitor 42 to the base 36. A potential from the battery source of energy 44 is applied to the collector through the inductor 46 in order to initiate oscillations within the oscillator circuit. The battery 44 is rendered operative to do so however when its ground terminal is connected to ground upon momentary closing of the actuating switch 48 associated with the pulse input 22, the switch 48 being connected to ground and normally in contact with the fixed contact 50 and out of contact with the fixed contact 52 connected to the ground terminal of the battery 44. Energy is transferred between the emitter 34 and the base 36 for sustaining oscillations in the oscillator circuit by a transformer coupling circuit including the primary coil 54 one terminal of which is connected to ground through a volume control potentiometer 56 and the other terminal being coupled through inductor 58 to the emitter. The transformer coupling circuit also includes a secondary coil 60 connected in series between the base resistor 62 and the ground resistor 64 to the base 36. A grounded filtering capacitor 66 is also connected in shunt relationship to the ground resistor 64. Audio-frequency modulation is normally introduced into the oscillator circuit by the capacitor 68 shunting the secondary coil 60. Also connected to the secondary circuit for modifying the modulation of the modulating circuit, is the capacitor 70 connected between the secondary coil 60 and the base resistor 62, the modifying capacitor 70 being connected to ground through the switch 48 in its normal position illustrated in FIGURE 3. In the position illustrated however, no oscillations will be sustained in the oscillator circuit inasmuch as the ground terminal of the battery 44 is disconnected from ground. It will however also be noted, that the other terminal of the battery is connected to one terminal of a storage capacitor 72, the other terminal of which is grounded, the storage capacitor being separated from the secondary circuit by the resistor 74.

It will be apparent from the foregoing, that actuation of the switch 48 will ground the ground terminal of the battery 44 through contact 52 to energize the transmitter and at the same time removing the capacitor 70 from its secondary coil shunting relationship. Oscillations within the oscillator circuit are thereby initiated while at the same time, the storage capacitor 72 is charged. In this half of the duty cycle, the carrier frequency signal radiated by the transmitter will be modulated at a relatively high audio-frequency determined by the capacitor 68 alone. After a moment, the switch 48 is released so as to be restored to the position illustrated in FIGURE 3 whereupon the storage capacitor 72 discharges to maintain the transmitter energized despite the disconnection of the ground terminal of the battery 44 from ground. During the second half of the duty cycle, wherein the transmitter is momentarily energized by discharge from the capacitor 72, the modulating circuit is modified by the introduction of the capacitor 70 into shunt relationship to the secondary coil 60 through the ground connection made by contact 50. The signal energy radiated will then be at a lower modulating frequency. The shunt capacitor 68 and the switched-in capacitor 70 are therefore arranged to provide a reasonable audio-frequency separation regardless of adjustments. It should also be understood, that the foregoing transmitter device construction could be altered so as to utilize two completely isolated audio coils in place of the single transformer secondary coil 60 associated with the switched-in capacitor 70. In this regard, it will therefore be appreciated that the transmitter to qualify as part of the system of the present invention, must radiate a sequence of signals at a common R.F. carrier frequency, the signals having different audio-modulating frequencies arranged in the proper sequence to complete a duty cycle to which the receiver unit responds.

Referring initially to FIGURE 1, the receiver unit 12 receives the signal energy radiated from the transmitter device through a superregenerative detector 76 in order to obtain good selectivity. The detector 76 is therefore tuned by the frequency tuner 78 to the carrier frequency of the signal energy radiated from the transmitter device 10 so as to separate therefrom the modulated components of the signal which are then amplified in the amplifier component 80. The modulated components of the received signal are then separated for transmission through separate channels by a relatively high frequency responsive component 82 and a relatively low frequency responsive component 84. The modulated components of the received signal are thereby operative through frequency discriminator components 86 and 88 to dispatch energizing signals to relay components 90 and 92. Simultaneous energization of the relay components will therefore be operative to close the associated relay switches 16 and 18. Thus, completion of the utilization circuit 14 will only occur when the relay components are simultaneously energized. In order to avoid unintentional or unauthorized triggering of the operator device by the utilization circuit 14, a resonate frequency interlock component 94 is provided through which the energizing signals are channeled to the relay components. The interlock component is therefore operative to prevent simultaneous development of energizing signals in the relay components by modulated components simultaneously transmitted through the channels associated with components 82 and 84. The interlock component 94 is operative instead, to restrict development of the energizing signals in the same sequence as the modulated signals are dispatched from the transmitter device 10. However, in order to obtain simultaneous energization of the relay components in response to the proper sequence of modulated signals, a duration delay component 96 is associated with the relay component 90 which in turn is associated with the modulated signal channel handling the high audio-frequency. In this manner, initial energization of the relay component 90 in the proper sequence will cause its energization to be prolonged in order to overlap subsequent energization of relay component 92 by development of the energizing signal therein when the low modulating frequency component is received. Also associated with the receiver unit, are monitoring facilities 98 connected to the respective channels between the frequency discriminator components and the interlock component. The tuning of the frequency channel components 82 and 84 so as to respond to the proper modulating frequencies, may thereby be adjusted.

Referring now to FIGURE 2, it will be observed that the detector component 76 includes the receiver antenna 100 coupled to the grid 102 of the detector tube 104 through a center tapped coupling inductor 106, coupling capacitor 108 and the grid capacitor 110. To provide good selectivity, the grounded inductor 106 is also connected by the coupling capacitor 108 to the variable tuning capacitor 78 of the tank circuit 112 which includes the inductive loop 114 in parallel with the capacitor 78. The tuning capacitor is therefore operative to vary the resonance carrier frequency of the tank circuit to that of the transmitter. A modulated carrier signal dispatched from the transmitter is therefore applied through the coupling capacitor 110 to the grid of the detector tube which also has an output plate 116 connected through the feed-back capacitor 118 to the ground terminal of the coupling inductor 106. Oscillations within the detector component are thereby blocked at the superaudible rate because of the bias voltage produced across the grid leak resistor 120 effecting plate current cut-off. The time constants of the grid capacitor 110, the grid leak resistor 120 and the cathode inductance 122 control the frequency of blocking so that the carrier voltage will be separated from the modulation components appearing as the plate output voltage.

Associated with the receiver unit, is a power supply 124 including the powerlines 126 and 128 connected to an A.C. source of voltage. The powerlines are connected to the primary 130 of power transformer 132 having secondary coils 134 and 136 with a common ground terminal. The output terminal of secondary coil 136 supplies filament voltage for all of the thermionic tubes including the detector tube 104 for heating the cathodes therein. The secondary coil 134 on the other hand, is connected by voltage dropping resistor 138 to the rectifier diode 140 so as to supply a rectified bias potential in line 142, the line 142 being connected to a grounded filter capacitor 144 for removing undesirable frequency components from the rectified bias potential. Accordingly, the output of the power supply at line 142 is connected to the voltage divider resistors 144 and 146, the juncture of which establishes the proper plate potential on the plate 116 of the detector tube 104. The amplifier grid 148 is separated by resistor 154 from cathode 153 connected to ground, in order to properly bias grid 148 and amplify a signal applied thereto. The plate 116 of the detector tube 104 is therefore connected by the coupling capacitor 152 to the grid 148 for amplification of its output signal. The amplified output of the amplifier stage appearing on the plate 156 is coupled through the resistor 158 to a push-pull amplifier stage 160, the plate 156 also being connected through feed-back capacitor 162 to the grounded terminal of resistor 146. Amplifier stage 150 is therefore operative to amplify with reduced noise and distortion and with compensated low frequency response in order to apply signals at the modulating frequencies to the grids 164 of the push-pull amplifier stage 160 through coupling capacitors 166. The respective sections 168 and 170 of the amplifier stage 160 will therefore establish separate channel paths for the modulation signals. The output plates 172 of the amplifier sections 168 and 170 are supplied with bias potential from the output of the power supply 124 through line 174 connected to a center tap of the inductor 176 providing an impedance coupling between the plates 172 of the push-pull amplifier stage 160. The respective output plates 172 are therefore coupled by coupling capacitors 178 and 180 to the frequency discriminator components 86 and 88 within which triggering signals are developed in response to reception of input signals at the audio-modulating frequencies to which the respective discriminator components are tuned.

Except for the tuning adjustment, each of the discriminator components 86 and 88 are similar in arrangement and operation. Each discriminator component therefore includes an input circuit having a primary transformer coil 182 connected in series with resistor 184 and capacitor 186 which in turn is connected to ground, the input circuit conducting an A.C. current in order to establish a rectified output voltage in an output circuit line 188 through either the rectifier diode 190 or the rectifier diode 192. The diodes 190 and 192 are loaded by resistors 194 and 196 having a juncture which is connected between the resistor 184 and the primary coil 182. The load resistor 194 is also shunted by capacitor 198 separated from ground by resistor 200. The load resistor 196 is in turn shunted by capacitor 202. Connected to the input circuit between the primary coil 182 and the resistor 184, is the transformer secondary coil 204 which is shunted by the capacitor 206 so as to provide an impedance for the secondary coupling circuit in resonance with the particular modulating frequency to be channeled through the frequency discriminator component 86. When an off frequency signal is applied to the input circuit of the discriminator component, the D.C. resistance component of the secondary coupling impedance will be relatively small as compared to the D.C. resistance of resistor 184, as a result of which a conductive path is established through the rectifier diode 192 in order to produce a negative voltage in the output circuit line 188. When resonance does occur however, the relative impedance of the secondary coupling changes so that the resistance of the resistor 184 is relatively smaller and therefore establishes a conductive path for the diode 190 to the output circuit line 188 establishing therein a positive potential. It will therefore be apparent, that the output circuit lines of the respective discriminator components will ordinarily be at negative potentials which are reversed or changed to positive when the input thereto is in resonance with the tuning of the discriminator component. The discriminator components are therefore tuned to the aforementioned modulating frequencies in order to respectively establish triggering signals in response thereto. Monitoring test jacks 208 and 210 are therefore connected to the respective output lines of the discriminator components so that the tuning thereof may be adjusted, using any suitable monitoring facility 98.

The resonate frequency interlock component 94 includes a double section triode tube 212, the grids 214 of which are respectively connected through grid resistors 216 and 218 to the output circuit lines of the discriminator compounds 86 and 88. The grids are also connected to grounded capacitors 220 and the cathodes 222 are connected in common between the voltage divider resistors 224 and 226 so that the proper bias potential will be applied thereto holding both tube sections 228 and 230 near cut-off. The voltage divider resistor 224 is therefore connected to the output line 142 of the power supply 124. It will therefore be apparent, that the negative potential in the output circuit lines of the discriminator components will maintain the tube sections 228 and 230 near cut-off and conversely, positive potentials in one of said output lines will render the associated tube section conductive driving the other tube section further toward non-conductance. Accordingly, the interlock component 94 will be operative to prevent simultaneous development of energizing signal current in the output plates 232 associated with each of the tube sections 228 and 230.

The output plate of the tube section 228 is connected by conductor 234 to one terminal of the relay coil 236 of relay component 92 while the output plate of the tube section 230 is connected by conductor 238 to the relay coil 240 of relay component 90. The other terminals of the relay coils are connected to the power supply output line 142 so that a relatively small current flows through the relay coils in the off signal condition of the receiver unit. When however, one of the tube sections 228 or 230 is rendered conductive by a positive potential applied to its grid from the output line of one of the discriminator components, the associated relay coil is energized in order to close the relay switch 16 or 18. However, associated with the relay coil 240 of the relay component 90, is the duration delay capacitor 96 shunting the relay coil 240 so as to be charged when the relay coil is being energized by the positive potential signal developed in the output line of the discriminator component 86. When this signal ceases and the tube section 230 reverts to its relatively nonconductive condition, the capacitor 96 discharges in order to maintain the relay coil 240 energized for a sufficient length of time. De-energization of the relay coil 240 is therefore delayed and remains energized when the subsequent energization of the relay coil 236 occurs by the positive potential signal developed in the output line of the low frequency discriminator component 88 rendering tube section 228 conductive. Accordingly, there is an overlap period during which both relay components are energized in order to close the associated relay switches 16 and 18 and complete the utilization circuit in order to trigger any operated device associated with the receiver unit.

From the foregoing description, the operation, construction and utility of the remote control system of the present invention will be apparent. To summarize operation thereof however, it will be apparent that a modulated carrier signal received by the antenna 100 of the receiver unit will be applied through the coupling circuit associated with the antenna to the super-regenerative detector 76 tuned to the carrier frequency of the transmitter device 10 by the variable tuning capacitor 78. All modulated components of the signal are therefore separated from the carrier signal and applied through coupling capacitor 152 to the grid 148 of the amplifier stage 150. The amplified output of the amplifier stage 150 is applied through the filtering resistor 154 to the tube sections 168 and 170 of the push-pull amplifier stage 160 in order to provide separate output channels from the plates 172 thereof. The output signal channels so established are respectively connected to the input circuits of the discriminator components 86 and 88 respectively arranged to respond to different audio-modulating frequencies. Accordingly, the component 86 tuned to the higher audio-frequency, will respond thereto in order to change the output potential from a negative to a positive value in order to render tube section 230 of the interlock component 94 relatively conductive. Energizing current is therefore conducted through the relay component 90 in order to close the relay switch 18 associated therewith in the utilization circuit. At the same time, the shunt capacitor 96 is charged. The tube section 228 is at the same time held non-conductive until the signal output of the discriminator component 86 ceases and an output signal appears in the output circuit line of the other discriminator component 88 in response to the lower audio-modulating frequency. Tube section 228 of the interlock component is then rendered conductive to establish an energizing current in the relay component 92. However, the shunt capacitor 96 will discharge for a predetermined period so as to maintain the relay component 90 energized for a sufficient length of time overlapping energization of the relay component 92. Accordingly, there will be a short period during which both relay switches 18 and 16 are closed in order to complete the utilization circuit. However, in order to complete the utilization circuit and trigger the operating device, it will be necessary that the modulating signals are properly phased and spaced since the interlock component 94 will not permit simultaneous development of the energizing signals for the relay components and will only establish the overlap energization period when the first signal to be developed arises from the high frequency discriminator component. The output of the transmitter device 10 must therefore satisfy these conditions in order to trigger the operator device. Accordingly, the transmitter is provided with a self-excited oscillator component ordinarily modulated by a relatively high audio-frequency modulation which is changed to a relatively low frequency modulation during a transmitter pulse pattern when the transmitter is energized. Energization of the transmitter may be accomplished by a switch momentarily actuated to initiate operation of the oscillator with the high frequency modulation. Release of the switch will then be operative for a predetermined period to continue energization of the transmitter at a relatively low frequency modulation in order to satisfy the aforementioned conditions of the receiver unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A private communication system comprising, a transmitter having means for radiating signal energy at a predetermined carrier frequency and modulating means for sequentially modulating said signal energy at lower and higher modulating frequencies, a receiver having means for detecting said lower and higher modulating frequencies when tuned to said predetermined carrier frequency, separate channel means coupled to said detecting means for respectively conducting signal energy at the lower and higher modulating frequencies, a utilization circuit having relay means respectively energized by modulated signal energy at said lower and higher modulating frequencies to complete the circuit, interlock means coupled to said separate channel means for preventing energization of the relay means in response to signal energy simultaneously conducted through the channel means at said lower and higher modulating frequencies, and delay means responsive to energization of the relay means by signal energy at one of said modulating frequencies for prolonging energization thereof to overlap reception of modulated signal energy at the other modulating frequency.

2. The combination of claim 1 wherein said separate channel means comprises at least two frequency discriminating networks respectively tuned to said lower and higher modulating frequencies, each network including, an input circuit for conducting A.C. current, an output circuit for conducting rectified current, resonate frequency coupling means connected to the input circuit means for changing the relative impedance of the input circuit in response to energy supplied thereto at one of said modulating frequencies, and rectifier means respectively coupling the input circuit and the resonate frequency coupling means to the output circuit for reversing the polarity of the potential therein in response to said supply of energy at said one modulating frequency.

3. The combination of claim 2 wherein said interlock means comprises a current controlling device having a pair of control electrodes respectively coupled to said separate channel means, input electrodes connected in common to a source of bias potential and output electrodes respectively operative to conduct energizing current for the relay means, one of said output electrodes being connected to the delay means.

4. The combination of claim 3 wherein said transmitter modulating means comprises, a modulating circuit through which energy is transferred to the radiating means when oscillating, a source of energy connected to the radiating means, energy storage means connected to said radiating means in parallel with the source of energy, circuit modifying means connected to said modulating circuit operative to change the modulation thereof, and switch means responsive to momentary actuation thereof for simultaneously rendering the modifying means inoperative and the source of energy operative to charge the storage means and initiate oscillations in the radiating means.

5. The combination of claim 1 wherein said interlock means comprises a current controlling device having a pair of control electrodes respectively coupled to said separate channel means, input electrodes connected in common to a source of bias potential and output electrodes respectively operative to conduct energizing current for the relay means, one of said output electrodes being connected to the delay means.

6. The combination of claim 1 wherein said transmitter modulating means comprises, a modulating circuit through which energy is transferred to the radiating means when oscillating, a source of energy connected to the radiating means, energy storage means connected to said radiating means in parallel with the source of energy, circuit modifying means connected to said modulating circuit operative to change the modulation thereof, and switch means responsive to momentary actuation thereof for simultaneously rendering the modifying means inoperative and the source of energy operative to charge the storage means and initiate oscillations in the radiating means.

7. The combination of claim 6 wherein said separate channel means comprises at least two frequency discriminating networks respectively tuned to said lower and higher modulating frequencies, each network including, an input circuit for conducting A.C. current, an output circuit for conducting rectified current, resonate frequency coupling means connected to the input circuit means for changing the relative impedance of the input circuit in response to energy supplied thereto at one of said modulating frequencies, and rectifier means respectively coupling the input circuit and the resonate frequency coupling means to the output circuit for reversing the polarity of the potential therein in response to said supply of energy at said one modulating frequency.

8. In a private communication system characterized by transmission of signal energy modulated at lower and higher modulating frequencies, a receiver including, means for detecting said lower and higher modulating frequencies, separate channel means coupled to said detecting means for respectively conducting signal energy at the lower and higher modulating frequencies, interlock means coupled to said separate channel means for preventing simultaneous transmission of signals therethrough in response to said lower and higher modulating frequencies, and delay means responsive to transmission of signals during reception of signal energy at one of the modulating frequencies for prolonging transmission of the signals to overlap reception of modulating signal energy at the other modulating frequency.

9. The combination of claim 8 wherein said separate channel means comprises at least two frequency discriminating networks respectively tuned to said lower and higher modulating frequencies, each network including, an input circuit for conducting A.C. currents, an output circuit for conducting rectified current, resonate frequency coupling means connected to the input circuit means for changing the relative impedance of the input circuit in response to energy supplied thereto at one of said modulating frequencies, and rectifier means respectively coupling the input circuit and the resonate frequency coupling means to the output circuit for reversing the polarity of the potential therein in response to said supply of energy at said one modulating frequency.

10. The combination of claim 8 wherein said interlock means comprises a current controlling device having a pair of control electrodes respectively coupled to said separate channel means, input electrodes connected in common to a source of bias potential and output electrodes respectively operative to transmit signal current, one of said output electrodes being connected to the delay means.

11. A private remote control system comprising, means for radiating signal energy at a R.F. carrier frequency, modulating means connected to said radiating means for sequentially modulating the signal energy radiated at different audio-modulating frequencies, superregenerative receiver means for detecting the modulated components of the signal energy radiated, means for transmitting the modulated components through separate channels, relay means operatively connected to each of the channels for energization in response to transmission of the modulated components therethrough at one of said modulating frequencies, interlock means for preventing simultaneous energization of the relay means and delay means connected to one of the relay means for prolonging energization thereof after cessation of the modulated component in the channel associated therewith.

12. The combination of claim 11 wherein said interlock means comprises a current controlling device having a pair of control electrodes respectively coupled to said separate channel means, input electrodes connected in common to a source of bias potential and output electrodes respectively operative to conduct energizing current for the relay means, one of said output electrodes being connected to the delay means.

13. A private remote control system comprising, means for radiating signal energy sequentially modulated at different modulating frequencies, means for detecting said modulated signal energy, means for establishing separate channels for modulated components of the signal energy received by the detecting means, utilization means energized by signals when simultaneously conducted in said separate channels, interlock means for preventing simultaneous development of said signals in the separate channels by the modulated components, and means responsive to development of a signal in one of said channels for prolonging the duration thereof to overlap the development of the other signal in the other channel.

14. The combination of claim 13 including monitoring means connected to said channels.

References Cited by the Examiner

UNITED STATES PATENTS

| | | | |
|---|---|---|---|
| 2,500,212 | 3/1950 | Starr | 325—37 |
| 2,604,518 | 7/1952 | Oliver | 325—37 X |
| 2,991,357 | 7/1961 | True | 325—105 |
| 3,183,414 | 5/1965 | Goetz | 317—138 |

DAVID G. REDINBAUGH, *Primary Examiner.*

JOHN W. CALDWELL, *Examiner.*